Dec. 5, 1939.     C. R. WASEIGE     2,181,985
AERIAL PROPELLER WITH VARIABLE PITCH
Filed April 25, 1935     5 Sheets-Sheet 1
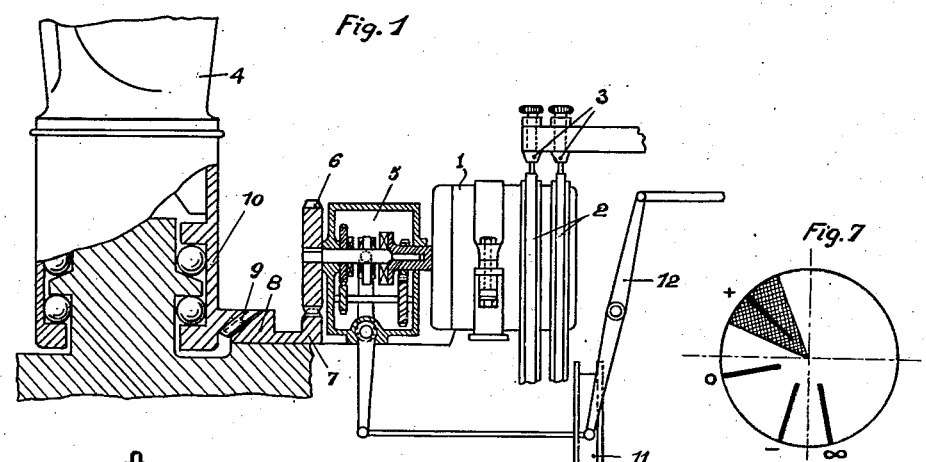
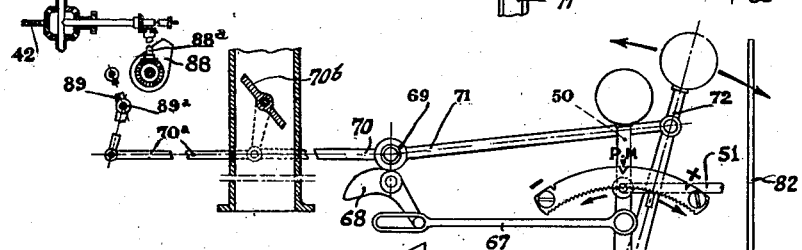
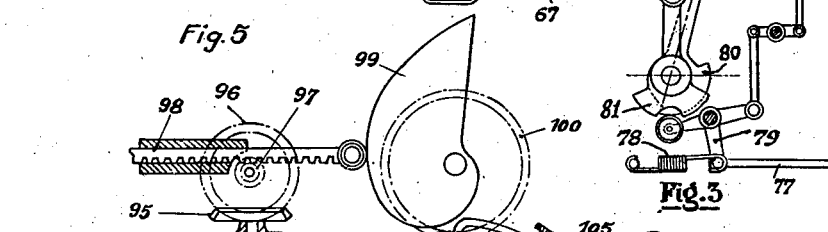
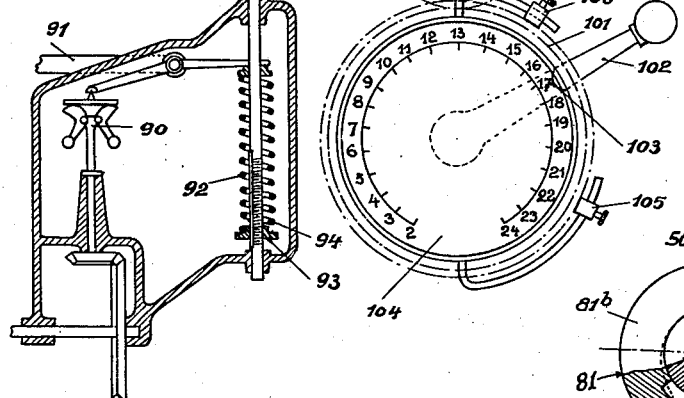
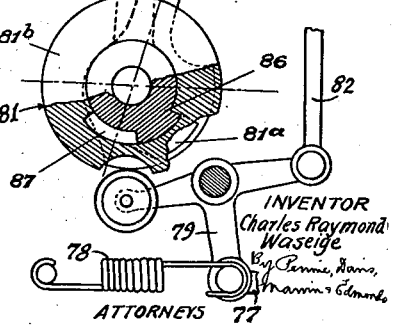
INVENTOR
Charles Raymond Waseige
ATTORNEYS

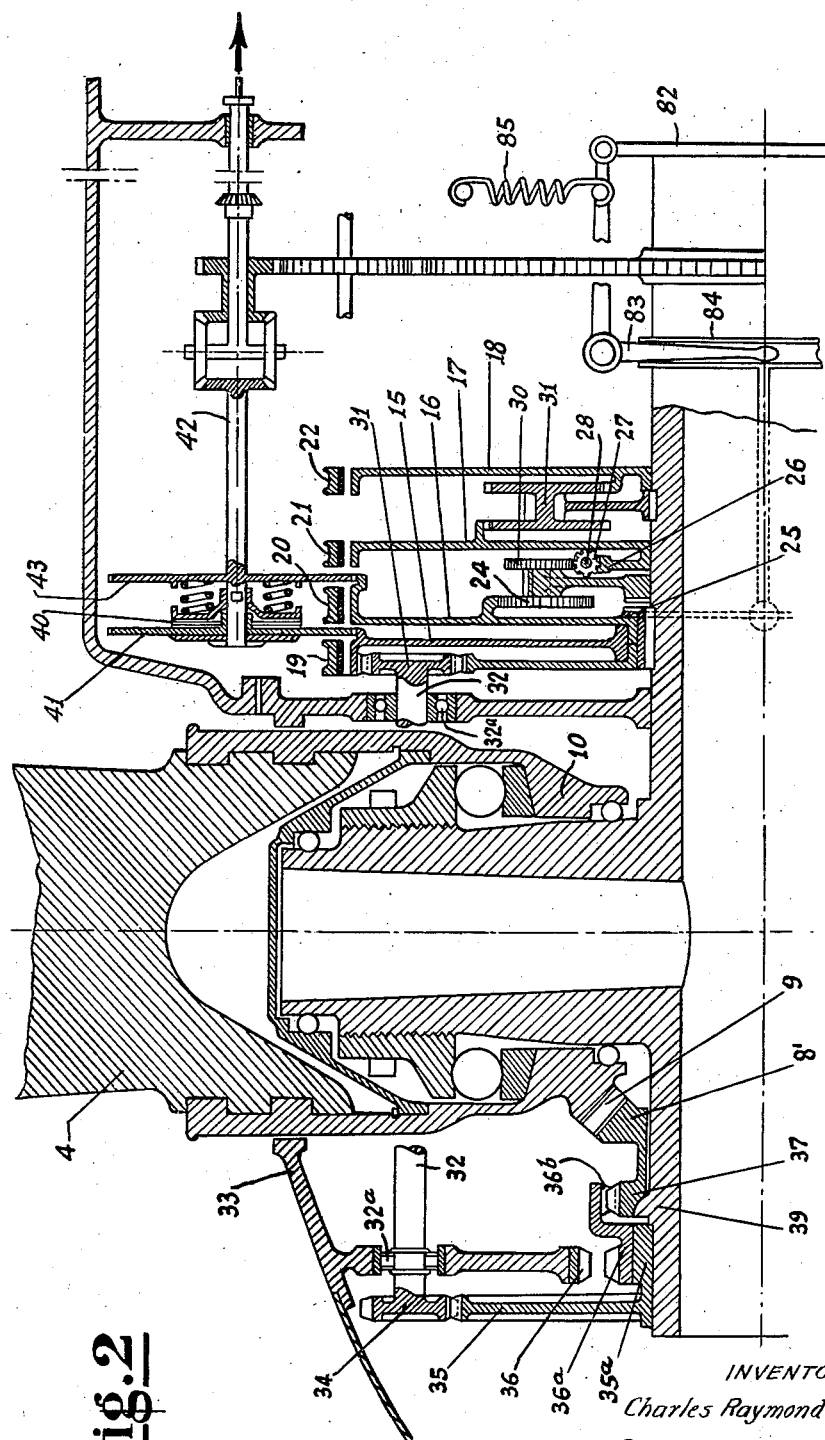

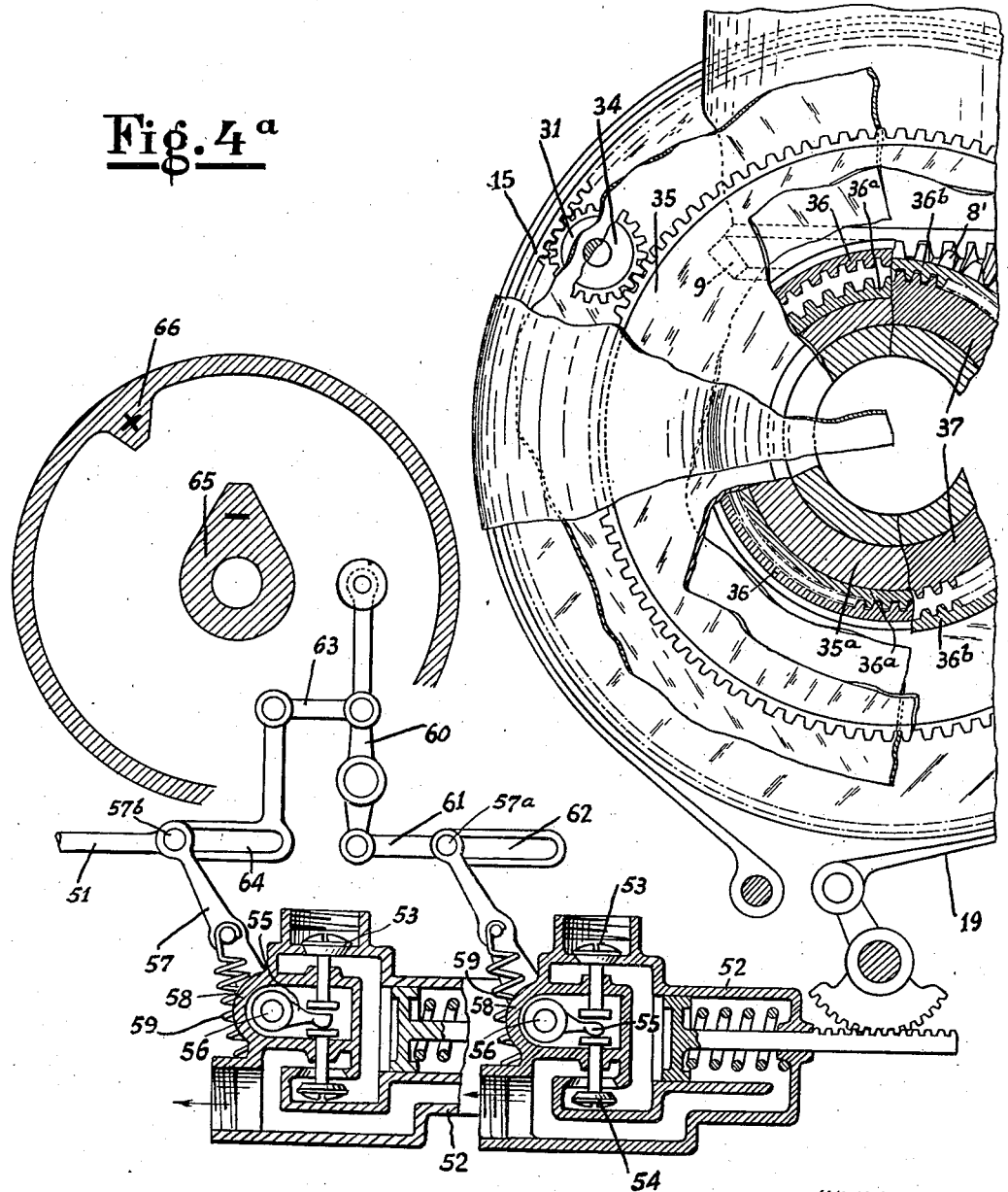

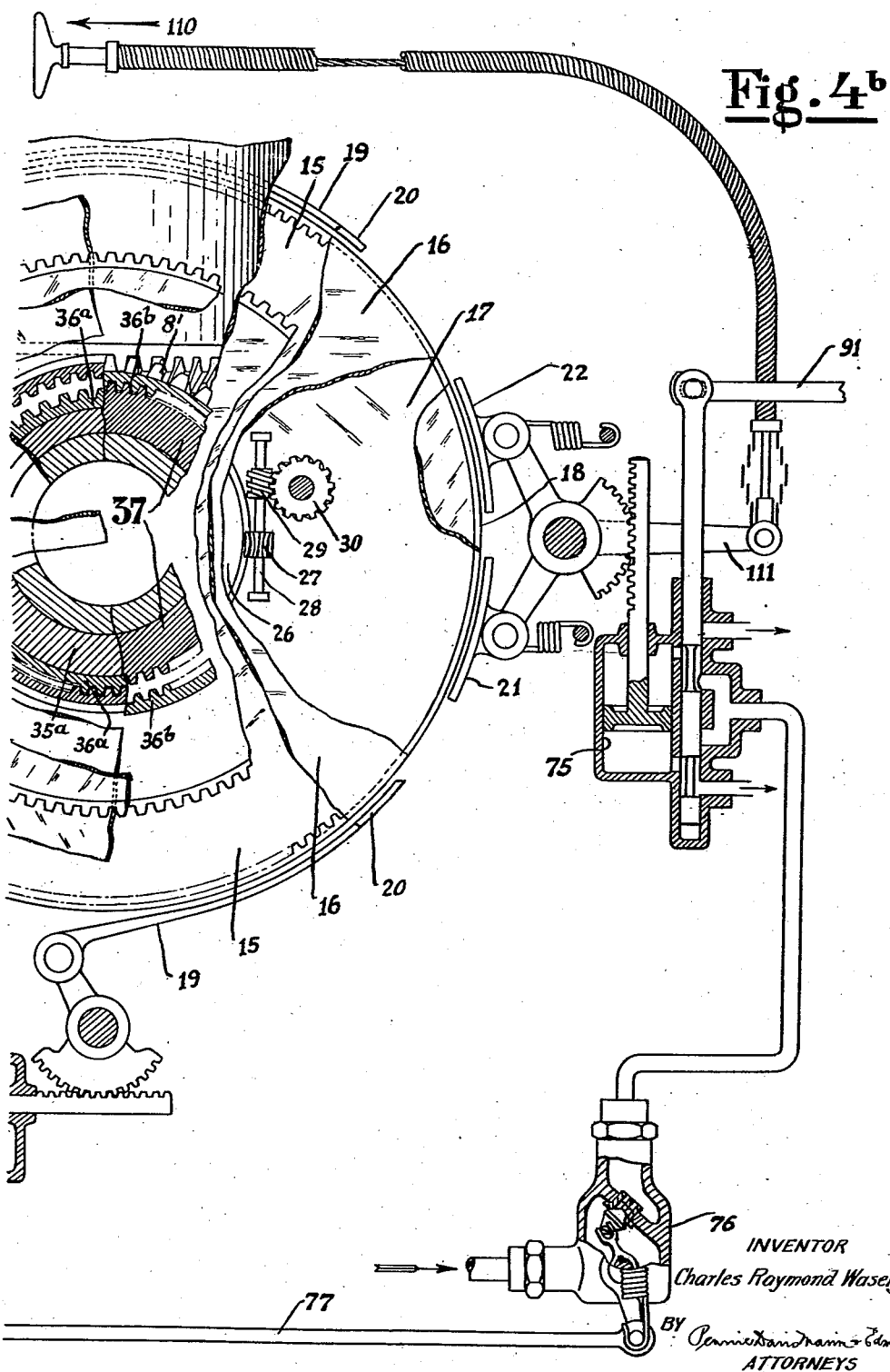

Patented Dec. 5, 1939

2,181,985

UNITED STATES PATENT OFFICE 2,181,985

AERIAL PROPELLER WITH VARIABLE PITCH

Charles Raymond Waseige, Rueil, France

Application April 25, 1935, Serial No. 18,139
In France May 1, 1934

4 Claims. (Cl. 170—163)

My invention relates to airscrew propellers with variable and reversible pitch used on aircrafts and has for its main object to provide a pitch varying and reversing gear by which it will be possible to obtain, when in flight for instance, a very slow variation of the pitch, and, particularly when landing, a very rapid pitch reversal, in a time which may be about one second.

A second important object of my invention is to provide a pitch varying and reversing gear whereby the pitch will be reversed rapidly from a fixed predetermined negative value to a fixed predetermined positive value and vice versa, without requiring any watch from the aircraft pilot once the reversal set in, with the consequence that the only way of varying at will the intensity of the braking effect exercised by the reversed propeller on the aircraft will be to vary the propeller speed.

A third object of my invention is to provide connections between the pitch varying and reversing gear, its control means, the propeller driving engine and the control means of the latter, in order to make some of them dependent on the other or others in some predetermined occurrences with a view to reduce as much as possible the attention required from and the operations to be made by the pilot.

These and other objects and advantages of my invention will appear thereafter from the description given below by way of example of two embodiments of my invention and this description should be read with the understanding that the form, construction and arrangement of the several parts may be varied within the limits of the claims hereto appended, without departing from the spirit of the invention as expressed in said claims. It is for instance to be understood that while my invention will be fully described in detail with reference only to one particular type of propeller where the driving power required for this variation and reversal is furnished by the propeller driving engine, it is also applicable to aerial propellers with variable and reversible pitch of any other type where the driving power is furnished by the pilot or by an auxiliary motor, electric or other.

In the annexed drawings:

Fig. 1 is a diagrammatic view, showing a propeller with variable pitch, in which the mechanisms for slow variation and for pitch reversal comprise a common source of power and a speed-changing device.

Fig. 2 is a diagrammatic view of a propeller with variable pitch which employs, as a source of power for the variation of the pitch, the propeller driving engine itself.

Fig. 3 is a partial diagrammatic view of a form of the controls which can be employed, chiefly in the case of the propeller shown in Fig. 2, as well as the connections between the controls.

Figs. 4a and 4b are similar to Fig. 3 but show other parts of the controls and their connections.

Figure 8:
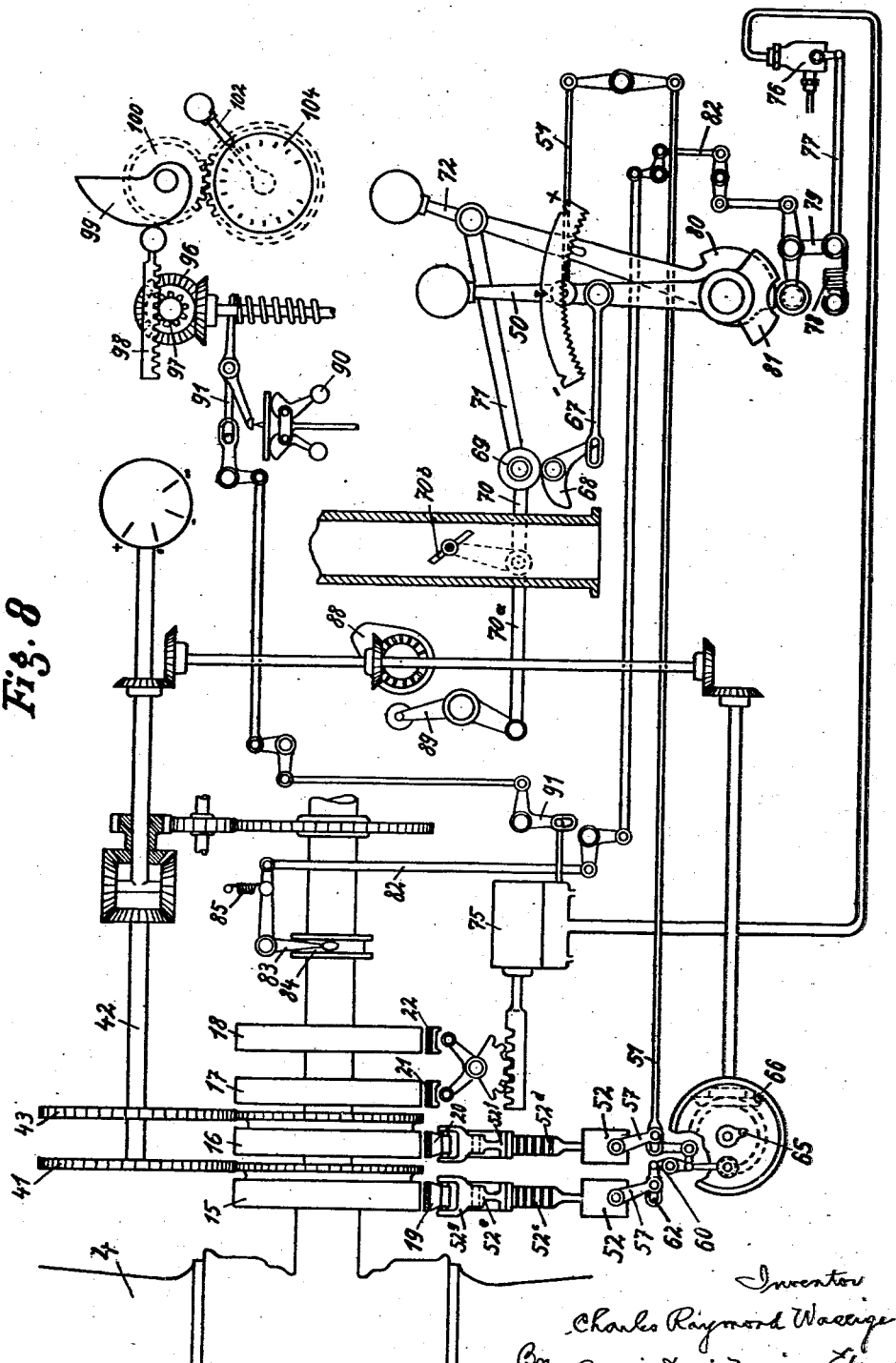

Fig. 5 relates to a device for the automatic control of the mechanism for the slow variation of the speed.

Fig. 6 represents a partial modification of the controls shown in Fig. 3.

Fig. 7 shows the dial of the pitch indicator.

Fig. 8 is a diagrammatic view of the general arrangements of the controls for the pitch varying mechanism and the pitch reversing mechanism.

In the embodiment shown in Fig. 1, the source of power for the variation of the pitch is an electric motor 1 which is supported in such way as to participate in the rotation of the propeller, and it is thus supplied by means of conducting rings 2 which are coaxial with the propeller and work against fixed brushes 3, or inversely.

The said motor is connected with the propeller blades 4 by driving gear comprising a speed-changing device 5, which in this case is a speed-changing device having two ratios, of the type containing a secondary shaft and adapted for direct coupling, but the device might be of any type. The remainder of the driving gear herein consists of a spur gear wheel 6 engaging a gear wheel 7 coaxial with the propeller and formed in one with a set of conical teeth 8 engaging conical teeth 9 mounted on the blade roots 10.

The control of the speed-changing device 5 is effected by means of rod-and-link gear of any kind, or like device, comprising a member which is coaxial with the propeller and rotatable with the latter, but which is movable lengthwise, and herein, this consists of a grooved ring 11 co-operating with a member which is held against rotation but is movable lengthwise, in this case, a fork 12.

The operating of the fork 12 will permit the use of either of the two ratios of transmission of the speed-changing device 5, thus affording a rapid change of pitch, which is preferably used for reversing the pitch, or on the contrary, for a slow variation of the pitch, and the change of direction for the pitch variation can be obtained for instance by reversing the motor by means of a usual reversing switch under automatic or manual control.

There is thus provided two gearings of different gear ratio adapted for respective operation, each of which is operatively connectable to the propeller blades to turn each of them, to vary the propeller pitch, to increase and to decrease it, so that one gearing provides for slow changes of pitch up and down and the other for rapid reversal of pitch up and down.

The embodiment shown in Figs. 2, 4a and 4b is another particular embodiment, according to the present invention, of pitch-varying mechanism comprising differential gearings adapted to be braked by means of a servo-motor using fluid under pressure, such as oil.

Herein, there are mounted concentrically with the propeller shaft four drums 15, 16, 17, 18 which are loose on their bearings, and co-operate with brakes 19, 20, 21, 22. The adjacent drums 17, 18 are connected together by a set of gearing having the speed ratio of which has a negative algebraical sign, i. e., a gearing such that the drums 17, 18 will rotate in contrary directions, for instance by means of a planetary device 23 whose support is secured to the propeller shaft. The drums 16, 17 are connected together by transmission gear comprising a planetary pinion 24 whose support can be coupled to or uncoupled from the propeller shaft, by means of any suitable clutch device 25, for instance of the tooth type; the said planetary pinion 24 is engaged on the one hand with a set of teeth on the drum 16, and on the other hand with the drum 17 by means of a speed-reducing device which herein consists of a worm portion located on the drum 17 and engaging a worm-wheel 27 keyed to a shaft 28 which is at right angles to the propeller shaft, and carries another worm 29 Fig. 4b engaging a suitable wheel 30 keyed to the shaft of the said planetary pinion 24. The drums 15—16 are also connected together by a set of gearing the gear ratio of which has a negative algebraic sign, employing herein for this purpose a pinion 31 engaging external and internal sets of teeth located on the respective drums 15—16, said pinion being keyed to a shaft 32 parallel to the propeller shaft and journaled in bearings 32a carried inside the propeller casing 33 by the wall of the latter, and thus shaft 32 will rotate with said casing. The movement of rotation of the pinion 31 on its axis is transmitted to the several blades by said shaft 32 and a mechanism to be further described.

It will be noted that when none of the drums are braked, the whole of this mechanism will rotate as a unit together with the propeller shaft, without any internal movement. If one of the drums 15 or 16 is braked, and if the support of the planetary pinion 24 is not secured, as to rotation, to the propeller shaft, the pinion 31 will rotate on its own axis, in one or the other direction depending upon which one of the said drums is braked, whereby increasing or decreasing the pitch. On the other hand, the drums 17 and 18 continue to operate with the same movement of rotation as the propeller, and the support of the planetary pinion 24 has the speed which is suitable for the conditions now prevailing.

When one of the drums 17—18 is braked, and when the support of the planetary pinion 24 has been connected, as to rotation, with the propeller shaft by means of the clutch 25, this sets up a relative movement (in one or the other direction, according to the drum 17, 18 which is braked) of the drum 17 and the support of the planetary pinion 24 and of the devices 27 to 30. Hence, through the medium of the speed-reducing parts 26 to 29, the planetary pinion 24 will turn on its own axis, in one or the other direction, and this movement imparts to the drum 16 a displacement with reference to the drum 15 which results, as in the preceding case, in a rotation of the pinion 31 on its own axis in one or the other direction.

It will be noted that there is thus provided two gearings the speed ratios of which are quite different, for the rotation of the blades; the ratio corresponding to the braking of the drums 15 and 16 will be used for reversing the pitch of the propeller both up or down according to which drum is braked, and the other ratio, obtained by braking the drums 17 and 18 and by the clutching of the support of the planetary pinion 24, will be used for slowly and gradually varying the pitch.

The movement of the pinion 31 itself and the movement of its shaft 32 may be transmitted to the different blades 4 by any suitable means. Herein, this transmission is advantageously obtained by the use of a pinion 34 which is mounted on the end of the shaft 32 and engages a gear-wheel 35 coaxial with the propeller shaft, thus actuating an epicycloidal speed-reducing device comprising a planetary pinion 36a rolling on a fixed sun wheel 36 concentric with the propeller shaft, said pinion being rotatably fitted on an extension 35a on the hub of the wheel 35. The outer surface of this extension is a cylindrical surface the axis of which is parallel to but at some distance from the propeller axis and the pinion 36a is concentric to said surface. Said pinion 36a carries an inner toothing 36b also concentric to said surface and which engages a set of teeth 37 coaxial with the propeller shaft and rotating together with a bevel pinion 8' engaging a bevel set 9 provided on each blade root 10. This device is practically irreversible.

Thus the invention includes pitch-varying means comprising two epicyclic toothed wheel trains having speed reducing ratios of opposite algebraical signs, that is, opposite motion.

The bevel wheel 8' is floatingly mounted, i. e., it is threaded with some radial play on the propeller shaft, and it is axially abutted against a hemispherical abutment 39.

In order to prevent any self-variation of the pitch due to the effects of jarring, it is known to use means for permanently and equally braking the drums, for instance a friction clutch mounted between the same. Herein, this friction clutch 40 is not mounted directly between the drums, but is located between a gear wheel 41, loose on a secondary shaft 42 which forms part of the device controlling the pitch indicator, and a wheel 43 rotating with said shaft, the two wheels 41—43 being positively rotated by the respective drums 15 and 16, whilst the bearings of the shaft 42 are stationary. The device controlling the pitch indicator is of a known type with the use of a differential and will not be further described.

Fig. 3 shows the hand lever 50 for controlling the pitch-reversing mechanism. This lever is connected by a rod 51, or like connecting member, with a device controlling a servo-motor 52 Figure 4a so arranged as to separately throw on the brakes 19 and 20. In this case, the servo-motor (Fig. 4a) operates by fluid under pressure, and comprises for each brake a cylinder 52 and a fluid distributing valve mechanism preferably adapted to supply fluid at full rate to the cylinder at all times except when completely cut off. For this purpose, the two valves 53 and 54 for admission and exhaust of the fluid are oppositely disposed and between their discs is located the end of a lever 55 mounted on a shaft 56 which carries two other levers 57 and 58 which are urged together by a spring 59. One of these levers, 58, is keyed to the shaft 56, the other lever being loose between two stops secured to the shaft and situated on the respective sides of the extended part of the lever 58, and thus the lever 57 will turn abruptly in one or the other direction under the action of the spring 59 when it proceeds beyond the said extended part. The two levers 57 are connected together by rod-and-link gear or the like and thus the two valves 53 can be closed simultaneously while the two valves are simultaneously open, but only one of the valves 53 can be opened at a time and the corresponding valve 54 closed at that time. Herein, the rod-and-link gear consists of a two-arm pivoting lever 60; to one arm is pivoted a link 61 having a slot 62 in which is engaged a stud 57*a* mounted on one of the levers, 57; to the other arm is pivoted a link 63, pivotally mounted on one arm of the rod 51, which is bent at right angles; the other arm of the rod which is pivoted to the said reversing lever 50 having a slot 64 in which is slidable a stud 57*b* pertaining to the other lever 57. Thus the whole mechanism can have three definite positions, that is, a middle or neutral position in which both valves 53 are closed, and the two valves 54 open and two end positions in which one of the valves 53 is open whilst the other is closed.

Consequently when the hand-lever is moved either way from its neutral position, this will effect the abrupt opening of one of the valves 53, according to the direction of the displacement of the hand-lever, thus throwing on the corresponding brake. The automatic stopping of the reversal by the release of the brake is effected, in this apparatus, by means of two cams 65 and 66 corresponding to two predetermined values, positive and negative, of the pitch, said cams being positively operated by the mechanism of the pitch indicator, and one or the other cam, according to the position of the hand-lever 50, will act upon the lever 60 in order to bring the lever 57 of the valve 53 (now open) into a position of unstable equilibrium, beyond which the spring 59 will effect the instantaneous closing of said valve 53 and the opening of the valve 54, as well as the return of the rod-and-link gear and the reversing lever 50 into the neutral position herein represented, in which both valves 54 are open and the two brakes 19 and 20 are released.

Further the reversing lever 50 is herein connected with the device for the control of the supply of carburated mixture to the propeller driving engine through a rod 67 (Fig. 3) pivoted at one end to the said lever 50, and at the other end to a pivoting cam 68 which acts upon an elastic joint 69 located between two rods 70—71, one of which, 70, is connected with the engine throttle 70*b* (Fig. 3) and the other, 71, with the hand-lever 72 for the control of this throttle. The joint 69 is made elastic by an elastic or resilient means arranged to urge and hold the rods 70—71 in a predetermined angular position. The connection between the rod 67 and the pivoted cam however provides for some lost motion in order that the cam will not turn when the hand-lever 50 is moved from its neutral position into the position corresponding to the positive value of the pitch. On the contrary, when the lever 50 is moved into its other position, the cam 68 is turned, and it thus moves the joint 69 when this is located on its path, which takes place for positions of the hand-lever 72 corresponding to a small opening of the engine throttle 70*b*. The movement of the joint 69 thus effects an increased opening of the engine throttle 70*b* without any displacement of the throttle control lever 72. When the lever 50 returns to its neutral position, the levers 70—71 return into the position of alignment.

As the mechanism for the slow variation of the propeller pitch is also actuated, in this apparatus, by a servo-motor 75 using fluid under pressure, there is interposed in the conduit supplying the fluid under pressure, a valve 76 adapted for quick opening and closing, the mechanism for this purpose being, for instance, of the type of the mechanism 57—58—59. This mechanism is controlled by a rod 77 urged by a spring 78, in such way that the valve 76 will be normally open, said rod being pivoted at the other end to a pivoted lever 79 located in the path of the cam 80; said cam is connected with the throttle control lever 72, and its outline is such that the rod 77 will be maintained, against the action of the spring 78, in a position in which the valve 76 is closed, whilst the hand-lever 72 is in the position in which the opening of the engine throttle is below a predetermined value.

In order to avoid all improper working, it is necessary that the mechanism for the slow variation of the pitch should not be actuated while the pitch-reversing mechanism is in action. For this purpose, use may be made of a control device similar to the control of the mechanism for slow variation of the pitch, by the throttle control lever 72, and it is preferable to employ such a device, as herein represented. For this purpose, the lever 79 co-operates with a cam 81 mounted on the reversing lever 50, and the outline of the cam is such that it is only when the lever 50 is in the neutral position that the lever 79 may be brought by the spring 78 into the position corresponding to the opening of the valve 76.

Furthermore, in the construction shown in Fig. 2, it is necessary, in order that the reversing mechanism may operate, that the support of the planetary pinion 24 shall be released. For this purpose, a connection is provided between the reversing lever 50 and the movable part of the clutch 25 in order that the displacement of the hand-lever 50 from its middle position will effect the release of the said support. Herein, this connection makes use of the said cam 81 and the lever 79 whose angular displacements are transmitted by suitable rod-and-link gear 82, or like device, to a pivoted fork 83 which moves the said movable part lengthwise, by means of a grooved collar 84 coaxial with the propeller shaft. The clutching, which might be effected by the pilot at will, is herein automatically effected by the action of an antagonistic spring 85.

A method for the control of the mechanism for the slow variation of the pitch, in such way that this mechanism cannot be actuated when the pitch has a negative value, is shown in Fig. 6, in which the control of the reversing mechanism is employed for this purpose. The cam 81, which cuts out the mechanism for slow variation during the operating of the reversing mechanism, is herein divided into two parts 81*a* and 81*b*; the part 81*a* turns together with the hand-lever 50, whilst the part 81*b* is connected with the same with a certain angular play, for instance by a tenon 86 engaged in a groove 87 in the said member 81b. These various members are set in such way that when the hand-lever 50 is moved from its neutral position into the position corresponding to the negative pitch, the tenon 86 will come against one end of the groove 87, thus moving the part 81b of the cam, which then bears upon the lever 79 and actuates the cut-out device 76 to 79, as well as the mechanism 82—85 which controls the clutch 25. When the handle 50 returns to the neutral position, the tenon 86 will slide in the groove 87 without moving the member 81b, which thus continues to hold down the lever 79. The mechanism for the slow variation of the pitch will thus remain out of action as long as the pitch is negative. When the hand-lever 50 is then moved into the position corresponding to the positive pitch, the tenon 86 will meet the other end of the groove 87, thus returning the member 81b to the initial position, but the part 81a of the cam is now substituted for the part 81b in order to hold down the lever 79. When the hand-lever 50 returns to the neutral position, the tenon 86 moves in the groove 87 without displacing the cam piece 81b and the part 81a is withdrawn, thus alowing the lever 79 to rise and hence to release the mechanism for the slow variation of the pitch.

Fig. 3 also shows an example of the construction of a device adapted to prevent the racing of the engine when the propeller pitch comes to zero and when the engine throttle is well open.

For this purpose, the present apparatus comprises a rotating cam 88 connected by suitable transmission means 88a with the mechanism 42 controlling the pitch indicator. The said cam actuates a lever 89 pivoting on a stationary axle 89a, and also pivoted to the rod-and-link gear 70—70a controlling the engine throttle 70b. It will be noted that the position of the lever 89 thus depends upon the position of the engine throttle 70b, and when the latter is sufficiently closed, the cam 88 can rotate without meeting the lever 89 when the pitch passes through the zero value. On the contrary, when the throttle 70b is well open, the lever 89 comes upon the path of the cam 88 and the cam will thus act upon the lever at the time when the pitch passes through the zero point, thus momentarily closing the engine throttle 70b.

Fig. 5 shows a device for the automatic control of the mechanism for the slow variation of the pitch according to the engine speed. Herein, the centrifugal governor 90 is driven by the engine and it controls the valve-gear of the servo-motor 75 by means of the lever 91. The tension of the spring 92 can be regulated while running, by the displacement of one of its supports consisting of a nut 93 mounted on a threaded rod 94 which can be rotated by suitable driving means, herein comprising the bevel gear wheels 95—96, the latter wheel being driven by the pinion 97 engaging a rack 98 actuated by a rotating cam 99 secured to a gear-wheel 100 engaging a like wheel 101 rotatable by means of a hand-lever 102 together with a pointer 103 moving over a dial 104 graduated in numbers of revolutions. Thus the displacement of the hand-lever 102 regulates the speed of the engine by causing a variation of the pitch, and the governor 90 will then keep this speed automatically constant by suitably actuating the mechanism for the slow variation of the pitch according to the conditions of flight, whether on a level, or for rise or descent, or the like.

Fig. 5 also shows a form of construction of a device for limiting the speed control of the governor to a range comprised between two extreme values. Said device herein consists of two stops 105 located on the path of the hand-lever 102, in such way that this lever cannot assume a position outside of the sector which is thus defined and which corresponds to engine speeds on either side of the normal working speed and not far from the latter. The extreme positions of the hand-lever 102 correspond to the extreme speeds which the engine cannot exceed as long as the automatic mechanism for slow variation of the pitch is enabled to act. On the contrary, when this automatic pitch-varying mechanism is out of action due to the position of the throttle control lever 72, which position determines a reduced admission of carburated mixture, the engine can run at slow speed at different speeds which depend upon the different positions of throttle lever 72, while stopping the action of the automatic mechanism for the slow variation of the pitch.

Fig. 4b shows a form of construction of a hand control 110 for bringing the propeller blades in line with the direction of the wind, in the case in which the oil pressure becomes reduced, or in case of other defective action. The said control 110 herein consists of a device of a known type operating by cable and acting directly upon a lever 111 controlling a brake shoe 22, and when this latter is applied, it will cause a gradual increase of the pitch. The general operation of the apparatus as a whole is as follows:

Operation

When the apparatus is used on board an aircraft, the reversing lever 50 is normally in its middle or neutral position as shown in Fig. 8 and the valve 76 is open so that the mechanism for slow and progressive variation of the pitch is operative whereas the pitch reversing mechanism is kept out of operation. In normal flight, the centrifugal governor 90 actuates this pitch varying mechanism in a known manner by the medium of the rod 91 to constantly keep the engine speed at the value readable on the dial 104 and determined by the position given to the control lever 102, as explained above with reference to Fig. 5, whatever is the position given to the control lever 72 and the flight conditions, i. e., whether the aircraft is flying up or down. However, and as explained herein before, when the control lever 72 is moved to close the throttle 70b beyond a predetermined limit, the cam 80 comes into engagement with the pivoting lever 79 and constrains the latter to turn against the action of the spring 78, whereby pushing the rod 77 and closing the valve 76. The servo-motor 75 is thus brought out of action and no further variation of the pitch takes place as long as the engine throttle 70b remains substantially closed, so that the engine can run at any desired slow speed.

When the pilot wishes to brake the aircraft, for instance on landing, he moves to the left of Fig. 8 the control lever 50 of the pitch reversing mechanism, whatever is the position of the engine control lever 72. As herein before described with reference to Fig. 3, the pitch is rapidly reversed and brought to a predetermined negative value in a time of about one second; the braking action of the propeller is then controlled by the pilot by means of the engine control lever 72. Meanwhile the cam 81 of the lever 50 has come into engagement with the lever 79 and rotated the latter against the spring 78, whereby pushing the rod 77 and closing the valve 76 so that the servo-motor 75 and consequently the pitch varying mechanism are out of action. As soon as the control lever 50 is automatically return to its middle position upon completion of the reversal, the spring 78 rotates back the lever 79 to its prior position and draws along the rod 77, thereby opening the valve 76 and putting again in operation the pitch varying mechanism.

To again give to the propeller a propelling action instead of a braking action, the pilot moves the control or reversing lever 50 to the right of Fig. 3 and the pitch reversing mechanism operates to bring the pitch to a predetermined positive value while the pitch varying mechanism is again kept out of action until the lever 50 has been automatically returned to its middle position.

During each reversal operation, the mechanism 88 to 89a, Fig. 3, operates in a known manner to momentarily close the throttle 70b when the pitch is passing through the zero value.

In the case of the mechanism shown in Fig. 6, the pitch varying mechanism is not automatically set into operation by the return of the reversing lever 50 to its middle position after the pitch reversing mechanism has brought the pitch to the predetermined negative value but remains out of operation as long as the pitch has this negative value. The pilot must first move the reversing lever 50 to the right in order that the reversing mechanism brings the pitch from said negative value to the predetermined positive value and unlocks the pitch varying gear by the return of the reversing lever from its right hand position to its middle position.

Fig. 7 shows a particular type of dial for pitch-indicator adapted for a propeller having the principal features of the invention. The said dial has four very apparent indicating marks corresponding to the four principal values of the pitch, i. e., an infinite value of the pitch, a predetermined negative value, a zero value, and a positive predetermined value, preferably the value which is suitable for the starting of the aeroplane from the ground.

Obviously, the invention is not limited to the details of construction herein described and represented, which are given solely by way of example.

What I claim is:

1. An air-screw propeller with variable and reversible pitch comprising in combination a propeller hub, a plurality of blades having each a root so journaled on said hub as to be rotatable to an extent from a positive pitch value to a negative one and vice versa, a pitch varying mechanism and a pitch reversing mechanism adapted for selective operation, each of which mechanisms includes a gearing and the gearing of the pitch reversing mechanism has a much smaller gear ratio than the gearing of the pitch varying mechanism, each of said mechanisms being capable of turning said blades to vary the pitch both positively and negatively, the reversing mechanism further including a movable control member adapted to control the operation of the reversing mechanism and to be given always the same position when the mechanism operates to reverse the pitch from a positive value to a negative one, a movable member connected to said blades to have a variable position depending upon the actual pitch value and arranged to actuate said control member to stop the reversing mechanism when reaching a position corresponding to a predetermined negative value of the pitch.

2. An air-screw propeller as in claim 1, wherein said pitch varying mechanism and pitch reversing mechanism include a change-speed gear.

3. An air-screw propeller with variable and reversible pitch comprising in combination a propeller hub, a plurality of blades having each a root so journaled on said hub as to be rotatable from a position of positive pitch value to a negative one and vice versa, a pitch varying mechanism connected to said blades to be capable of slowly turning each of them in contrary directions, a pitch reversing mechanism connected to said blades to be capable of turning each of them in contrary directions at a much faster rate than the pitch varying mechanism, a governor responsive to the engine speed and connected to the pitch varying mechanism to automatically control the latter, and locking means adapted to lock said pitch varying mechanism and connected to the pitch reversing mechanism to be controlled by the latter so as to be operative only as long as said pitch reversing mechanism is in operation.

4. An air-screw propeller with variable and reversible pitch comprising in combination a propeller hub, a plurality of blades having each a root so journaled on said hub as to be rotatable from a position of positive pitch value to a negative one and vice versa, a pitch varying mechanism connected to said blades to be capable of slowly turning each of them in contrary directions, a pitch reversing mechanism connected to said blades to be capable of turning each of them in contrary directions at a much faster rate than the pitch varying mechanism, a governor responsive to the engine speed and connected to the pitch varying mechanism to automatically control the latter and a connection between the pitch varying mechanism and the pitch reversing mechanism, said connection being so constructed and arranged that the pitch varying mechanism is dependent on the pitch reversing gear in such a way as to be inoperative as long as the pitch has a negative value.

CHARLES RAYMOND WASEIGE.